United States Patent [19]

Fry et al.

[11] Patent Number: 5,140,630
[45] Date of Patent: Aug. 18, 1992

[54] ADDED MAIN LINE APPARATUS

[75] Inventors: James L. Fry, San Rafael; Larry Martin, Sebastopol; Robert B. Johnston, Petaluma, all of Calif.

[73] Assignee: Light Logic, Ltd., San Rafael, Calif.

[21] Appl. No.: 694,144

[22] Filed: May 1, 1991

[51] Int. Cl.$^5$ .............. H04M 3/02; H04M 13/00
[52] U.S. Cl. .................. 379/179; 379/373; 379/253; 379/418
[58] Field of Search .......................... 379/379

[56] References Cited

U.S. PATENT DOCUMENTS

| | | | |
|---|---|---|---|
| 4,105,957 | 8/1978 | Cathell | 331/110 |
| 4,192,007 | 3/1980 | Becker . | |
| 4,270,028 | 5/1981 | Young . | |
| 4,349,703 | 9/1982 | Chea, Jr. . | |
| 4,349,704 | 9/1982 | Gillis . | |
| 4,399,499 | 8/1983 | Butcher et al. . | |
| 4,611,097 | 9/1986 | Grimes . | |
| 4,656,659 | 4/1987 | Chea, Jr. . | |
| 4,727,570 | 2/1988 | Tarbouriech | 379/361 |
| 4,891,609 | 1/1990 | Eilley . | |
| 4,914,396 | 4/1990 | Berthiaume | 328/14 |
| 4,924,511 | 5/1990 | Burns et al. . | |
| 4,955,053 | 9/1990 | Siegmund | 379/253 |
| 5,001,748 | 3/1991 | Burns et al. | 379/418 |

Primary Examiner—Stafford D. Schreyer
Attorney, Agent, or Firm—Brumbaugh, Graves, Donohue & Raymond

[57] ABSTRACT

An added main line system is disclosed with particular utility in connection with equipment for providing the services of two telephone lines on a single conductor pair. The ring generator of the added main line system has two transistor bridges, one for the ringing signal on each of two subscriber lines. In each bridge, diagonally opposed pairs of transistors are turned on in alternation, providing alternating current for the ringing signal. The two bridges, each of which has four transistors, share two transistors. Comparators provide off-hook detection during the ringing cycle. Off-hook detection circuits are provided in series with selected driver transistors of the bridges, so that the condition of customer equipment going off-hook may be detected even though limited power is available for testing for the off-hook condition. Ring detectors at the central office are coupled digitally to ring generators at the subscriber equipment, and bit-message protocols are provided so that the added main line apparatus is able to replicate, at the customer line, the ringing cadence provided at the central office.

12 Claims, 9 Drawing Sheets

ADDED MAIN LINE APPARATUS

BACKGROUND OF THE INVENTION

The invention relates generally to systems for providing a plurality of telephone circuits over a smaller number of metallic wiring pairs, and relates more particularly to a digital added main line system having improved ring generator, off-hook detector, and ring cadence replication capability for use in a system providing an added main line for a telephone subscriber over an existing conductor pair.

Figure 1:
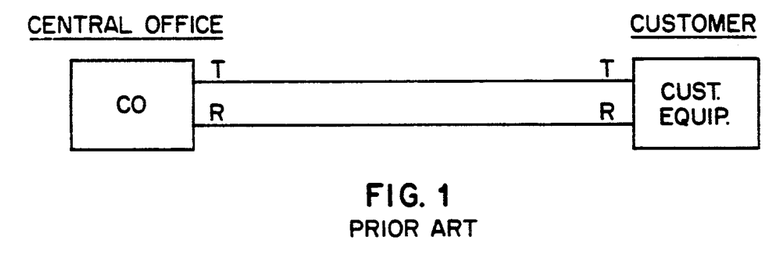
FIG. 1 shows a typical prior art subscriber loop.

A typical telephone circuit is shown in FIG. 1. A central office provides two copper conductors shown as T and R (for "tip" and "ring") which extend in unbroken metallic continuity to the customer. Customer equipment is connected to the tip and ring conductors to complete the loop, often called a "local loop". The voltages, currents, and signaling methods employed in typical telephone local loops are well known and will be detailed herein only as required to explain the inventive added main line system.

Figure 2:
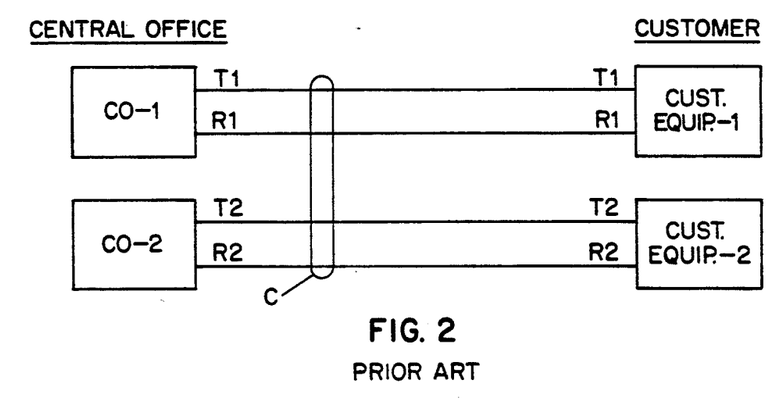
FIG. 2 shows the installed equipment after provision of a prior art added telephone line.

Telephone customers, both residential and commercial, demand ever greater numbers of telephone circuits for voice communication, computer data exchange by modem, print information transmission by telecopier, credit card verification, and burglar alarm monitoring. FIG. 2 shows the historically most frequent outcome upon a customer's requesting the installation of an additional telephone line. In addition to the previously existing conductors T and R (here denoted T1 and R1) the telephone company installs (or assigns from previously installed spares) two additional conductors T2 and R2. These provide continuous metallic connection between central office equipment CO-2 and customer equipment 2.

As will be readily appreciated by those skilled in the art, the cost of the facilities (i.e. copper pair) associated with the added line increases with the distance d between the central office and the customer. Where d is large there is an incentive to consider other means of supplying the added line.

Feasibility of provision of the added copper pair T2, R2 is a function of the existing or expandable capacity of the conduit c. The conduits will typically have been designed and installed based on older, more moderate, projections of growth in demand. It is not uncommon in urban areas for every possible wire path in a conduit c to be filled, so that adding a copper pair requires construction of additional conduit at prodigious expense. This becomes a problem both for underground conduits and for wiring risers in buildings. Telephone companies are faced with the prospect of burying or stringing additional wire pairs from the central office to the customer premises, a time-consuming and expensive process which may only have to be repeated if the number of additional pairs installed is again outstripped by demand.

It frequently happens in present-day times that a telephone customer orders an additional telephone line and the telephone company is not able to install it since all existing copper wire pairs to the customer's premises are in use. Much attention has thus been paid in recent years to the problem of expanding the effective capacity of the installed infrastructure of copper pairs of telephone wire.

In the very long term trends in installation of fiber optic cable may ease some of these problems since the information bandwidth for a given cross-sectional area of fiber is many times that of copper. But near-term models for fiber penetration suggest that for many years and for many service areas only expansion of the capacity of the existing copper will permit meeting customer needs.

Figure 3:
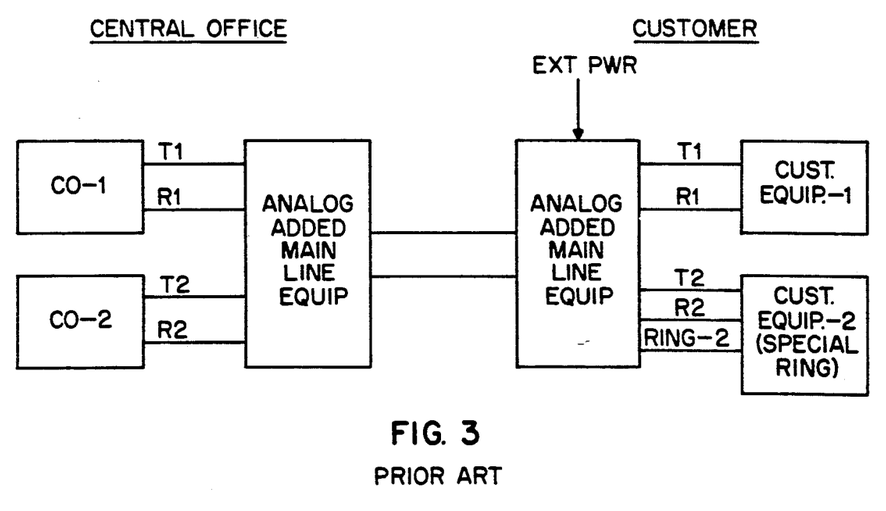
FIG. 3 shows a prior art analog system for providing an added main line.

Attention has thus turned to the development of so-called "added main line" equipment. FIG. 3 shows one approach based on known analog circuitry. Tip and ring signals from two central office lines are provided to analog added main line equipment in the central office; functionally that equipment receives four conductors from the central office and provides two conductors to the customer. Other analog added main line equipment at the customer's premises receive the two conductors from the central office and provide four (or more) conductors for connection to customer equipment. Known analog added main line equipment may have any of several drawbacks. For example, the added main line equipment at the customer's premises typically requires provision of external power, as shown in FIG. 3. Thus the usual reliability of the telephone service even in the face of loss of local power is lost. Another drawback may be that one or both of the customer equipment connections is nonstandard. In one commonly used analog added main line system, for example, the second line cannot accommodate conventional telephone instruments and answering machines; the ringing signal is provided by a separate wire to the customer equipment which must be modified to accept the separate ringing signal.

In any added main line system, whether it is of the design shown in FIG. 3 or is of novel design, there must be so-called "ring generator" circuitry to generate the ringing signals that annunciate an incoming call to the customer equipment. (The terminology of "tip" and "ring" identifying the two wires of a pair has its origins in the contacts of a plug used to connect the loop; the term "ring" in this context has nothing to do with the voltages for ringing telephones.) There is thus a need for a ring generator which satisfies several constraints. The ring generator should be line-powered rather than requiring external power. The limited amount of power which can be passed over a conventional copper pair dictates that the ring generator's use of power extracted from the line be extremely efficient. Indeed the ringing portion of a telephone call is associated with the highest currents and voltages of any portion of the call.

In any added main line system, whether it is of the design shown in FIG. 3 or is of novel design, there must be so-called "off-hook detection" circuitry in the customer-side equipment. For example, when one of the customer lines needs to ring, the customer-side equipment generates the abovementioned ring signals. If the customer equipment takes the ringing line off-hook (e.g. picks up the telephone) it is necessary that the customer-side equipment detect this event. Known off-hook detection circuits typically have a large potential across the customer equipment, and have a large resistor in series with the line. And in many central office designs the ringing voltage is applied across the series combination of the large resistor and the customer equipment. The requirement of this large potential, together with the large resistor, limits the power efficiency of the system. As mentioned above, the customer-side equipment is desirably powered by energy transmitted over the copper loop, and so the power available for supervision of the off-hook status of the subscriber equipment is limited. There is thus a need for an off-hook detection system that works without the need of such a high potential. And there is thus a need for ringing arrangements that minimize the dissipation of ringing energy at locations other than the customer telephone equipment.

The tip and ring signals provided for the customer's equipment for each line should be such that conventional telephone instruments and accessories may be used without modification. It is also desirable that sufficient ringing current be provided that the customer may plug in as many devices that consume ringing current as would be possible with connections such as those of FIGS. 1 and 2. It is also necessary that the added main line system be able to detect the condition of customer equipment going off-hook (e.g. a telephone handset being picked up) despite the limited power available for testing for the off-hook condition.

The ringing signal provided to customer equipment in the United States is most commonly provided with a duty cycle or cadence of two seconds on, four seconds off. It has become commonplace in recent years, however, for telephone companies to generate other cadences, such as to provide distinctive ringing signals to indicate which of several telephone numbers had been used to reach the customer. It is thus desirable that the added main line apparatus be able to replicate, at the customer line, the ringing cadence provided at the central office.

There is particularly a need that all these conditions be satisfied reliably and without undue expense.

SUMMARY OF THE INVENTION

In keeping with the invention, a ring generator portion of the added main line apparatus is disclosed with particular utility in connection with equipment for providing the services of two telephone lines on a single conductor pair. The generator has two transistor bridges, one for the ringing signal on each of two subscriber lines. In each bridge, diagonally opposed pairs of transistors are turned on in alternation, providing alternating current for the ringing signal. The two bridges, each of which has four transistors, share two transistors. Comparators provide off-hook detection during the ringing cycle. An oscillator controls circuitry that generates drive waveforms designed to control the transistors safely and efficiently. The ring generator operates efficiently to provide all required ringing voltages on the limited energy budget available in a line-powered system.

In keeping with the invention, there is also disclosed an added main line apparatus with particular capability to replicate, at each subscriber loop, the ringing cadence received at the central office for the corresponding central office line. The apparatus comprises a ring detector, a ring generator, and communications means for providing signal bits therebetween to replicate the cadence.

Finally, there is disclosed an added main line apparatus which provides power and a communications channel for audio information all over a metallic loop of the type historically provided for a single telephone line. At the central office equipment, direct current power is passed through windings of a transformer and metallically therethrough to the local loop. An analog signal is imposed on the transformer containing digitally encoded signals indicative of the off-hook and on-hook line status and of the presence or absence of ringing signals; the digitally encoded signals are also indicative of the audio provided at each end of each of the two subscriber lines. At the customer end of the loop, the direct current power is extracted and provided to a high-efficiency switching power supply which provides the positive and negative DC levels required by the other portions of the added main line apparatus at the customer end of the loop. The analog portion received at the customer end of the loop is coupled to digital coding and decoding circuitry which generates audio signals for provision to the customer equipment. A corresponding audio information propagation path back to the central office line is provided for the audio generated by the customer equipment.

BRIEF DESCRIPTION OF THE DRAWINGS

The invention will be explained with respect to the accompanying drawings, in which.

Throughout the figures like elements have been shown, where possible, with like reference designations.

DETAILED DESCRIPTION

Figure 4:
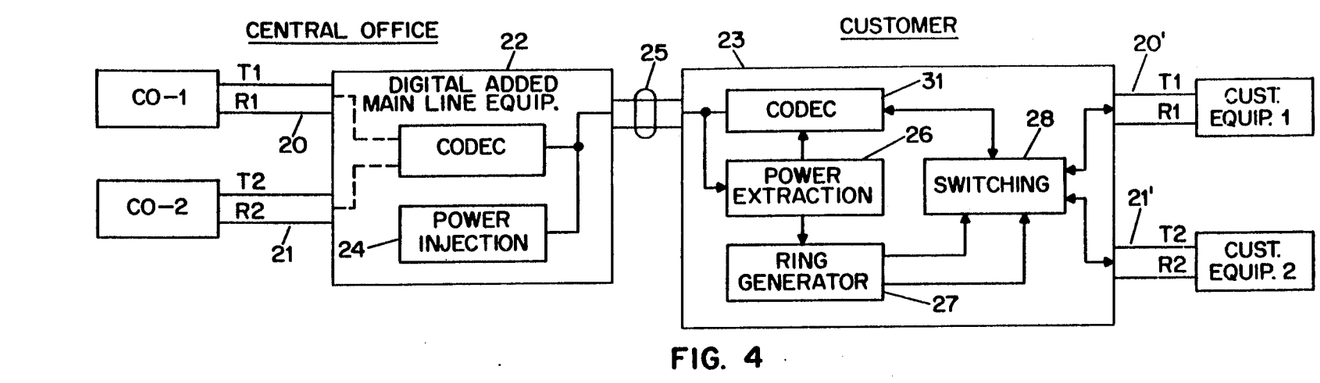
FIG. 4 shows in functional block diagram form the added main line system employing an embodiment of the ring generator of the invention including the added main line equipment at the customer's premises.

FIG. 4 shows the added main line system employing an embodiment of the ring generator according to the invention. It will be appreciated that one of the design goals for the system is that from the user's point of view, tip and ring signals 20' are as nearly as possible indistinguishable from tip and ring signals 20, and similarly for tip and ring signals 21' and 21. Installed at the telephone company central office is added main line equipment 22, containing among other things power injection circuitry 24 which permits copper pair 25 to convey not only the historically expected voiceband information channel but also the power for the customer-located added main line equipment 23. Equipment 23 includes power extraction circuitry 26 which gives power at predetermined voltage levels to the other parts of equipment 23, including ring generator 27. Switching circuitry 28 selectively connects subscriber lines 20' and 21' to the ring generator 27 or to other circuitry within equipment 23.

Figure 5A:
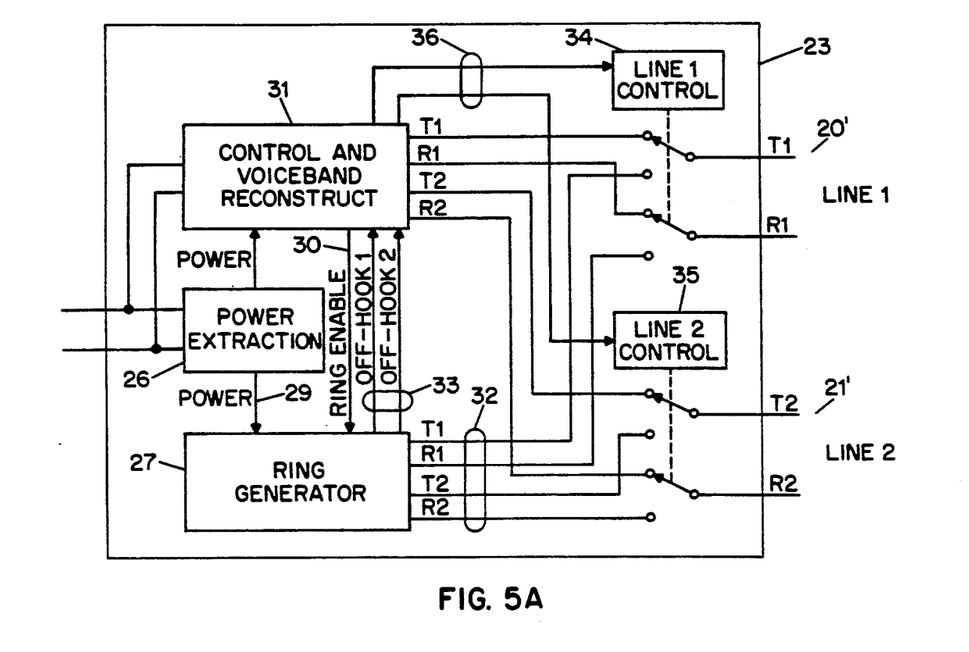
FIG. 5A shows in greater detail the added main line equipment at the customer's premises of FIG. 4, including the ring generator according to the invention.

The equipment 23 is shown in somewhat greater detail in FIG. 5A, where power extraction circuitry 26 and ring generator 27 may again be seen. Ring generator 27 receives power via lines 29 (shown as a single line for clarity) and is commanded to generate ringing signals by ring enable control line 30 from control and voiceband reconstruct circuitry 31 (sometimes referred to herein for brevity as coded 31) of equipment 23. Ring generator 27, constructed in accordance with the invention, provides ringing signals at lines 32 for selective connection with customer equipment at lines 20' and 21'. For compatibility with existing customer equipment, the ringing signals should be typically more than 40 VAC RMS at 20 Hz, and able to drive customer equipment with a summed ringer equivalence number (REN) of 5. Ring generator 27 also detects the condition of customer equipment for either line 1 or line 2 going off-hook (e.g. answering an incoming call) and annunciates this occurrence to control and voiceband reconstruct circuitry 31 by way of lines 33. Solid-state double-pole double-throw switches 34 and 35, controlled by lines 36, selectively connect either the customer's equipment for line 1 or for line 2, or both, to the ring generator or to control and voiceband reconstruction equipment 31.

Figure 5B:
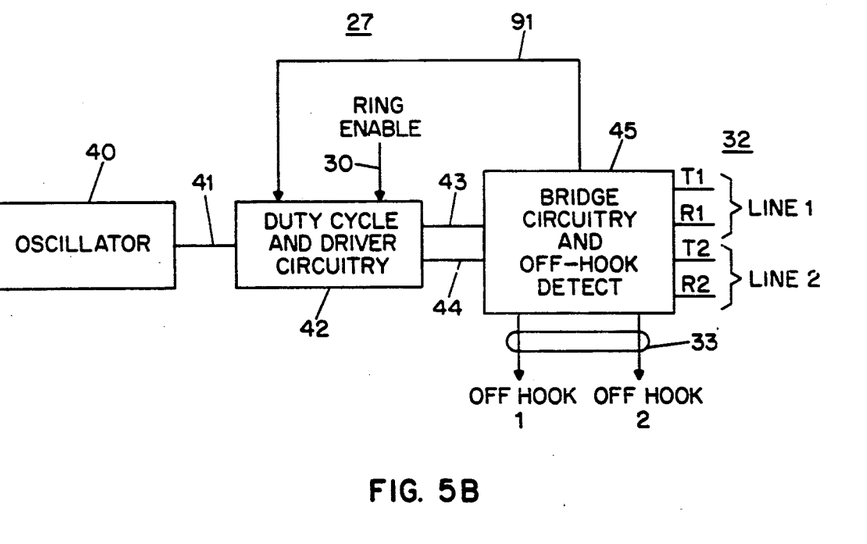
FIG. 5B shows the ring generator of FIG. 5A in functional block diagram form, including an oscillator, duty cycle and driver circuitry, and circuitry providing bridging and off-hook detection.

The ring generator 27 is shown in functional block diagram form in FIG. 5B. Oscillator 40 provides a 20-Hz signal by line 41 to duty cycle and driver circuitry 42. Upon receipt of the ring enable signal 30, circuitry 42 generates duty cycle signals 43, 44 to bridge and off-hook detection circuitry 45. Tip and ring signals on lines 32 for lines 1 and 2 ar provided by circuitry 45. If customer equipment of line 1 or line 2 goes off-hook during ringing, a corresponding off-hook signal 33 is provided. Also shown in FIG. 5B is AC feedback line 91, discussed below in connection with FIG. 8.

Figure 6:
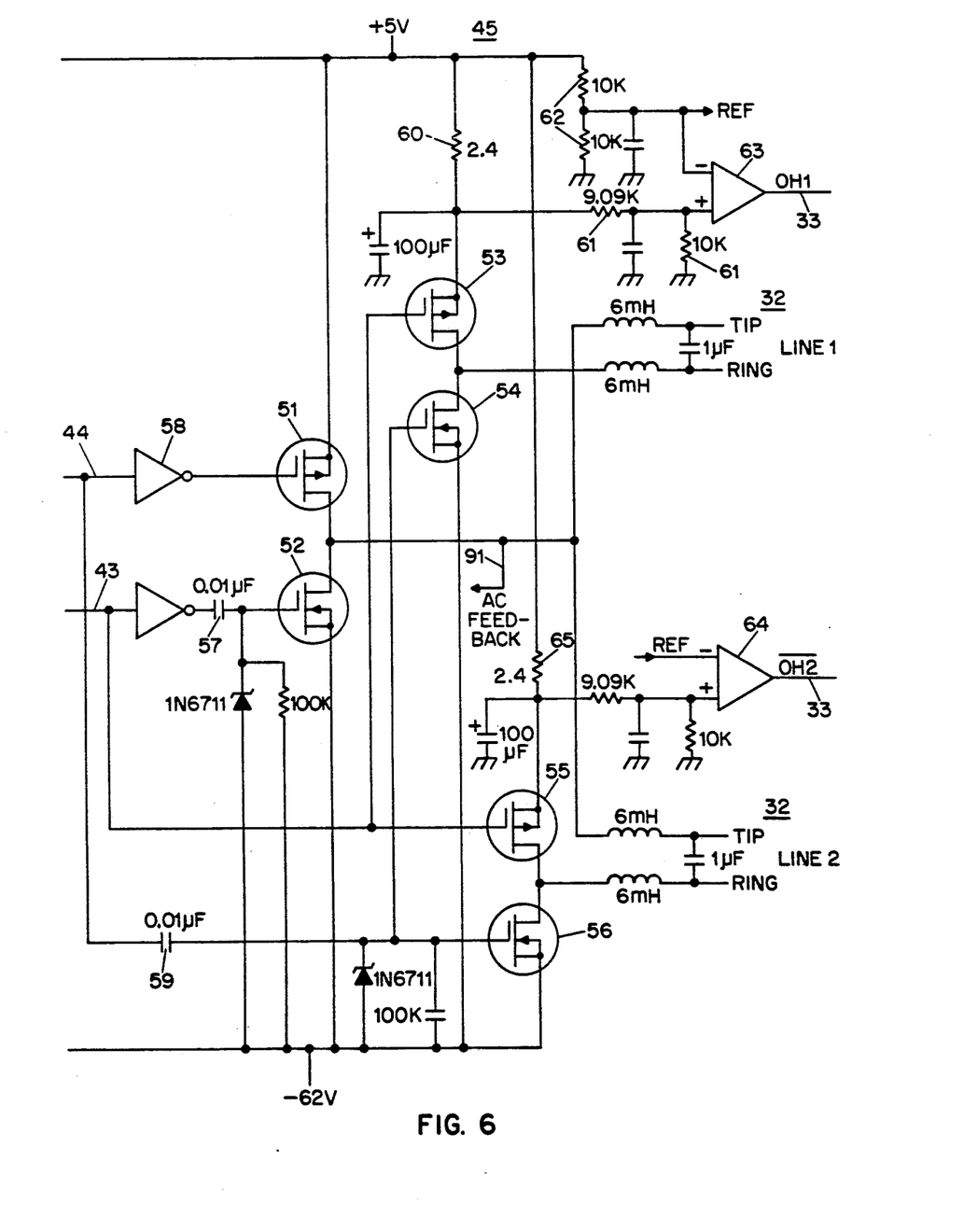
FIG. 6 shows in schematic form the bridging and off-hook detection circuitry of FIG. 5B, including bridges for providing ring voltages to the two customer lines.

Turning now to FIG. 6 there is shown in schematic form the bridging and off-hook detection circuitry 45 of FIG. 5B. At top and bottom are power supplies, preferably a +5VDC level like that used elsewhere in the ring generator 27 and a −62 VDC level also provided by power extraction circuitry 26. Entering at left are duty cycle signals 43, 44. At right are tip and ring signals 32 providing ringing signals to customer equipment. Also at right are off-hook annunciation signals 33 for provision to control and voiceband reconstruction circuitry 31. The detailed function of the circuitry 45 of FIG. 6 will no be discussed.

Most of the time the circuitry 45 is in a quiescent state; the duty cycle signals 43, 44 are at values such that none of the field effect transistors 51-56 conducts. As a result, no power is provided to lines 32. Duty cycle signal 43 is high, which turns off transistors 53 and 55. The unchanging state of signal 43 leaves transistor 52 off as coupling capacitor 57 is in series with the gate thereof. Duty cycle signal 44 is low so the output of inverter 58 is high, turning off transistor 51. The unchanging state of signal 44 leaves transistors 54 and 56 off as coupling capacitor 59 is in series with the gates thereof. In the discussion that follows signal 43, if high, is called "not asserted" and "asserted" otherwise. Signal 44, if high, is called "asserted" and "not asserted" otherwise.

The voltage drop across resistor 60 is negligible as no current flows through any of the FETs, including FET 53. Voltage divider 61 is across essentially the same +5V as is voltage divider 62. The latter provides a reference level to comparators 63 and 64, and in the above-mentioned quiescent condition comparator 63 has a high output, indicative of the absence of an off-hook condition. Similarly comparator 64 measures the voltage drop across resistor 65 and, in the quiescent condition, yields a high output. The outputs 33 of the comparators 63 and 64 are provided to control and voiceband reconstruct circuitry 31 and discussed above.

When ringing signals are desired, duty cycle signals 43 and 44 are provided as described in further detail below. Several constraints are imposed on the permitted states of signals 43 and 44. They should never be asserted simultaneously, or the field effect transistors would provide a near-short circuit across the +5 V and −62 V power supply lines; this would likely damage the transistors. Indeed it is preferable to allow some interval between the times when the two signals are asserted to avoid race conditions under which one line is asserted too closely on the heels of the other being non-asserted.

Figure 7A:
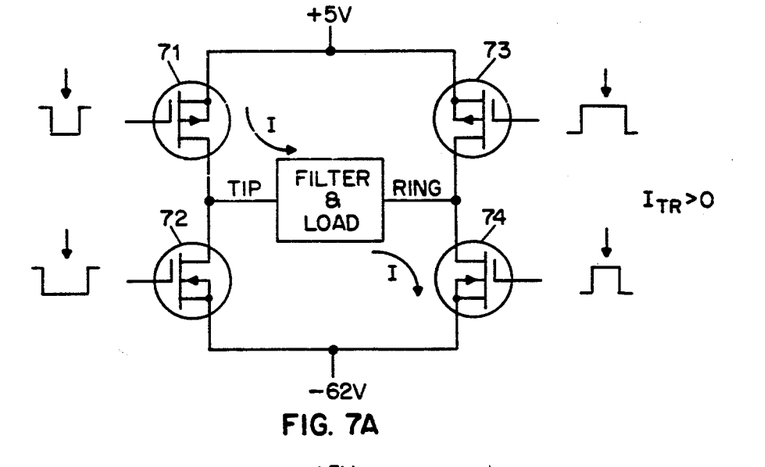
FIGS. 7A and 7B show current flow during parts of the ringing cycles in the operation of one of the bridges of FIG. 6.
Figure 7B:
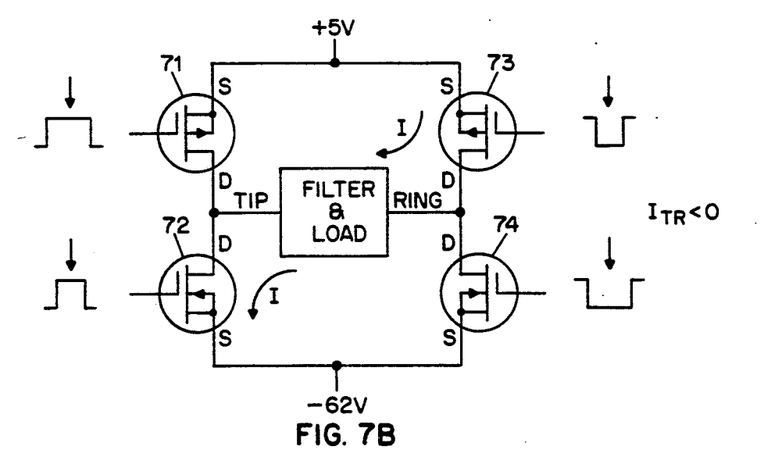

The sequence of events in a ringing signal is illustrated in FIGS. 7A and 7B. FIGS. 7A and 7B show a transistor bridge which could, for example, be the bridge of transistors 51, 52, 53, or 54. (The figure is also representative of the function of the bridge of transistors 51, 52, 55, and 56.) Next to each of the four gates is a waveform showing the voltage present at the gate at the time illustrated by the figure. In FIG. 7A, the point in time being shown has transistors 71 and 74 turned on, so that conventional current flows from tip to ring in the load (customer telephone equipment); the current in the tip-to-ring direction is positive. In FIG. 7B, the point in time being shown has transistors 72 and 73 turned on, so that conventional current flows from ring to tip in the load; the current in the tip-to-ring direction is negative.

A full-wave bridge such as is shown in FIGS. 6, 7A, and 7B has several advantages over other designs. The potential difference between the high and low voltage levels, here 72 volts, is effectively doubled as received by the customer equipment. This makes the full-wave bridge preferable over, say, a circuit having a load grounded at one end with higher-voltage positive and negative supplies switched by only two transistors, since in the latter configuration the transistors and power supply components would require much higher voltage ratings and switching losses due to capacitances in the transistors would be greater. The drawback to the full-wave bridge is the need for more transistors and gates.

Figure 8:
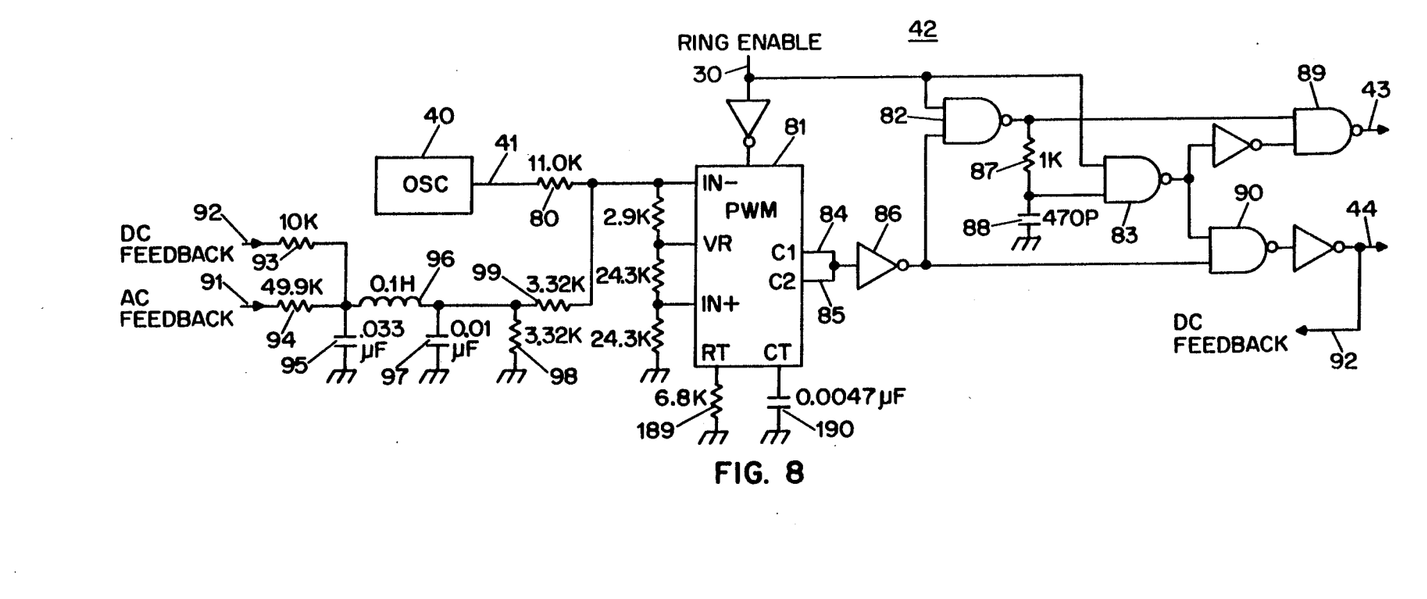
FIG. 8 shows in schematic form the duty cycle and driver circuitry of FIG. 5B.

Turning now to FIG. 8, there is shown in schematic form the duty cycle and driver circuitry 42 of the ring generator 27. Oscillator 40 provides a 20-Hz sine wave via line 41 to the duty cycle and driver circuitry 42, and via resistor 80, to an input of pulse width modulator (PWM) 81. In the quiescent state, the ring enable signal 30 is not asserted, so PWM 81 is not enabled. Ring enable signal 30 also turns off Schmitt trigger gates 82 and 83, yielding the above-mentioned quiescent outputs at 43 and 44 so that none of the transistors 51-56 (shown in FIG. 6) is on.

When the ring enable signal 30 is asserted the PWM 81 is enabled, and shaped pulses at 40 kHz are supplied at the outputs 84, 85 to gate 86. The 40-kHz pulse rate is defined by resistor 189 and capacitor 190, both shown in FIG. 8, which are configured by circuitry internal to PWM 81 to form an RC timer giving rise to 40 kHz. Each of the outputs 84, 85 has a duty cycle of between 0 and 49%, so the two outputs when combined have a duty cycle between 0 and 98%, depending on the programming of the PWM 81. The PWM 81 provides its pulses with duty cycles that vary over a time frame corresponding to the desired output of the ring generator, namely over cycles of 20 Hz. That is, the output of the ring generator is an approximation to a 20-Hz sine wave, built up by 40-kHz pulses each of which varies in duration to convey an amount of energy appropriate for the corresponding phase of the desired 20-Hz sine wave.

The PWM rate of 40 kHz was chosen to compromise between competing requirements. It should be as low as possible to minimize switching losses (which rise as the square of the frequency) but should be as high as possible to minimize interference problems with other portions of the circuitry.

Gate 86 provides the pulses to the aforementioned Schmitt trigger gate 82, and the pulses are delayed by the delay circuit of RC network 87, 88 and Schmitt trigger gate 83; the original pulse and its delayed replica are summed together in gates 89 and 90 to create nonoverlapping pulses for application to the above-mentioned transistors 51-56. This satisfies the aforementioned constraint regarding nonsimultaneous assertion of the duty cycle signals.

Returning momentarily to FIG. 6, it will be noted that the P-channel FETs 51, 53, and 55 are all driven directly with the TTL level outputs of the logic devices shown, e.g. gates 58, 89. The N-channel FETs 52, 54, and 56 require additional circuitry for the required 5-volt gate voltage. For each control line, the control signal is capacitively coupled by capacitors 57, 59. The gate voltages are clamped to −0.4 volts (with respect to the FET sources) when the input is at a low TTL level. When the input goes to a high TTL level the gate voltage is forced to +4.6 volts, which suffices to turn on the transistor. In FIG. 6 it will also be noted that AC feedback line 91 has been provided, also shown in FIG. 8.

Returning to FIG. 8, it will be seen that AC feedback line 91 is coupled by resistor 94 and a lowpass filter 95, 96, 97 and attenuator and matching network 98, 99, with the output summed with the oscillator output 41 and provided to the PWM 81. It will also be seen that feedback line 92 provides duty cycle signal 44 as an input through resistor 93. This provides DC feedback so that the circuit will always start under all initial conditions.

Figure 9:
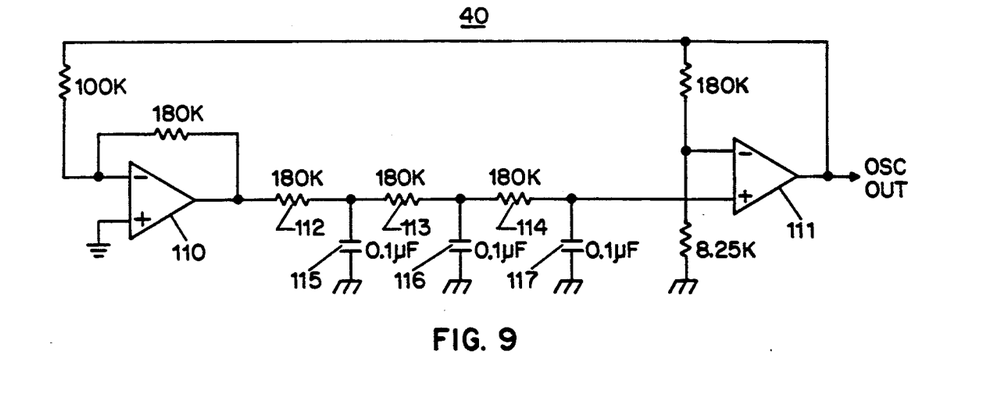
FIG. 9 shows in schematic form the oscillator of FIG. 5B.

Turning now to FIG. 9, there is shown in schematic form the oscillator 40 shown above as a functional block in FIGS. 5B and 8. The operational amplifiers 110, 111 have outputs that can swing to the power supply rails under light loads. The output of operational amplifier 110 drives a phase shift network consisting of resistors 112, 113, 114 and capacitors 115, 116, 117. The network gives a 180 degree phase shift at a frequency of 20 Hz. This, together with the inversion at amplifier 110, makes the loop oscillate.

The phase shift network also desirably functions as a lowpass filter. The second harmonic is reduced by about 14 dB and the third harmonic by about 23 dB, relative to the fundamental.

Amplifier 111 has a gain of about 23, which corresponds approximately with the attenuation of the phase shift network. Amplifier 110 has a gain of about 1.8 so that it clips on both output swings, reducing the even harmonics of the output. If the output were a pure square wave, the third harmonic would be 10 dB below the fundamental, but the actual softer limiting reduces the harmonics even more. Thus the output of the oscillator 40 has very little harmonic distortion.

Figure 10:
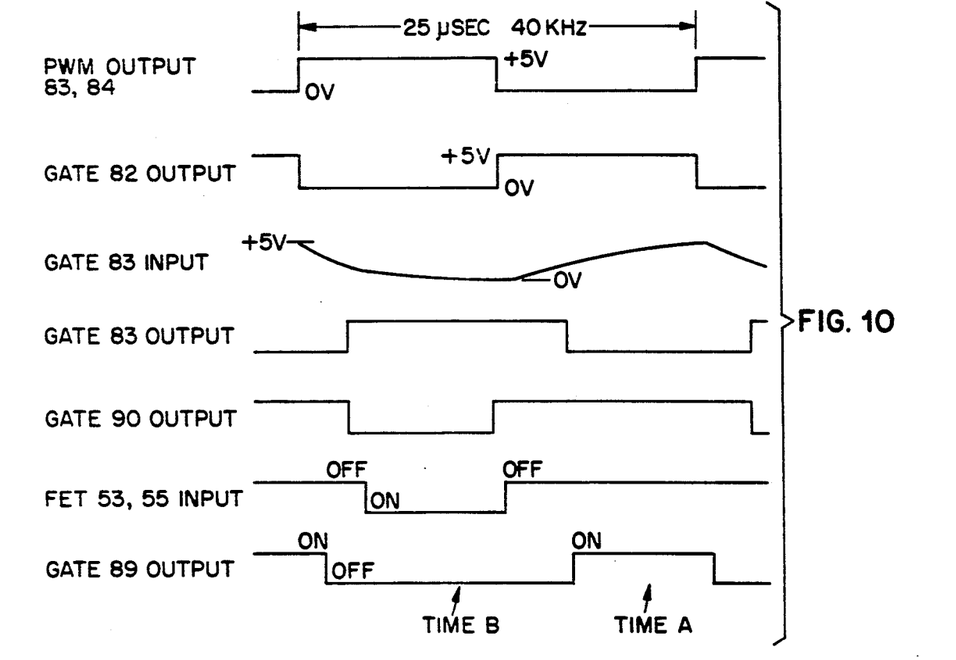
FIG. 10 shows sample waveforms at various parts of the ring generator during one cycle of ringing.

FIG. 10 shows sample waveforms at various parts of the ring generator during one cycle of ringing. It is noted that the waveforms shown for duty cycle signals ar TTL levels. The waveforms shown for the transistor gate drive levels are TTL levels with legends showing whether the controlled transistor is on or off. Time A corresponds to FIG. 7A, and time B corresponds to FIG. 7B.

Figure 11:
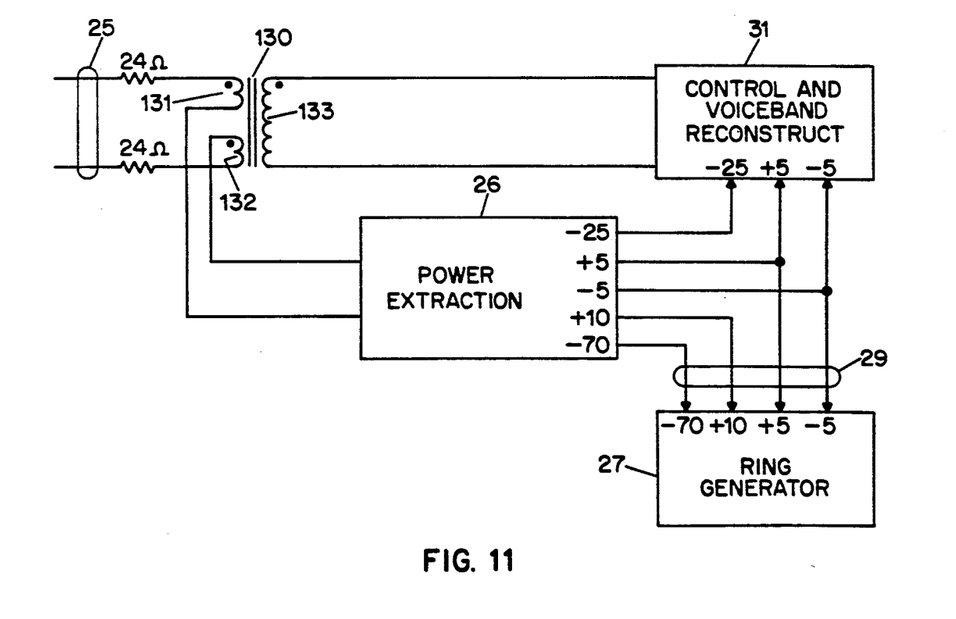
FIG. 11 shows in somewhat greater detail the power extraction and distribution portions of FIG. 5A.

Turning now to FIG. 11, the interconnections between the power extraction block 26 and the control and voiceband reconstruct block 31 are shown in greater detail. Transformer 130 receives the tip and ring conductors 25 from the central office. Windings 131, 132 are phased so that the AC component of the signal from the line 25 is substantially passed through the transformer to winding 133 and thence to block 31. The remaining energy content, substantially direct current, passes to block 26. By these connections the direct current is extracted for use in the customer block 23.

Figure 12:
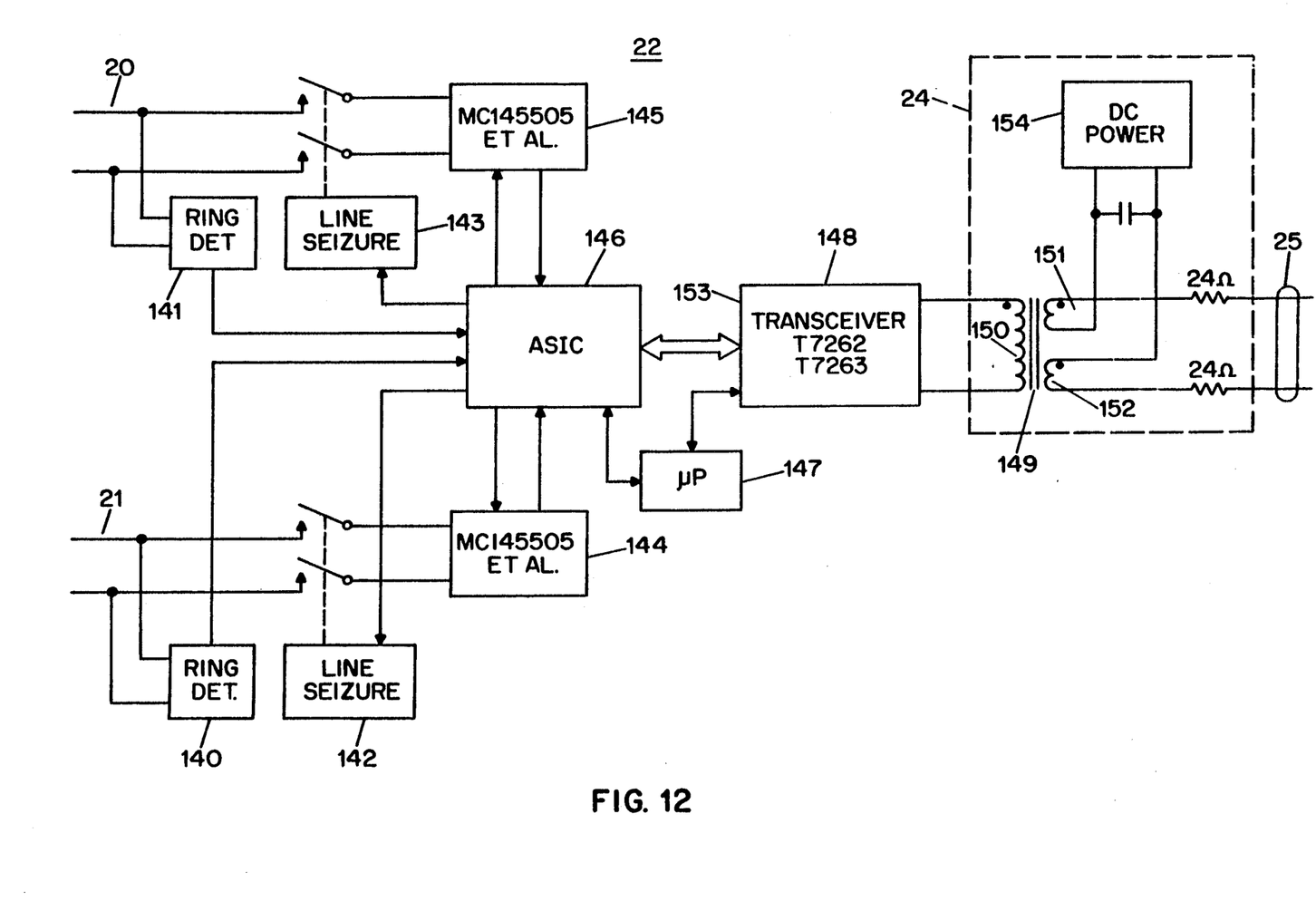
FIG. 12 shows in functional block diagram form the central office equipment 22 of FIG. 4.

The power insertion at the central-office end of line 25 is shown in FIG. 12, together with the audio coding and decoding of the central office equipment 22. Ringing voltage, if any, present on central office line 20 is detected by ring detect block 141 and a TTL level signal annunciates this to application-specific integrated circuit 146. Digitally encoded signals indicative of the TTL level changes are propagated through transceiver block 148 under control of microprocessor 147. The digitally encoded signals are coupled by winding 150 to line 25. Corresponding circuitry conveys such information for central office line 21 as well.

Digitally encoded signals from line 25 indicative of customer equipment going off-hook or on-hook are received at transceiver 148 and communicated over bidirectional bus 153 to ASIC 146. ASIC 146 selectively energizes and deenergizes line seizure relays 142, 143 to follow the transitions at the customer equipment.

ASIC 146 and transceiver 148 do not merely pass back and forth single-bit messages regarding ring detection and hook status. They also provide, together with specialized line-interface blocks 144 and 145, full bidirectional voice bandwidth audio channels for each of the central office lines 20, 21. Thus where each of the central office lines 20, 21 is in use, each of the parties at each end of the lines can hear the other party on the line. In a two-line system, four substantially independent audio signal paths are provided, one in each direction for each of the two lines.

DC power supply 154 derives power from power distribution lines, not shown in FIG. 12 for clarity, within the central office. Its DC current is supplied to windings 151, 152 which are phased so that the audio from winding 150 propagates through to line 25.

Figure 13A:
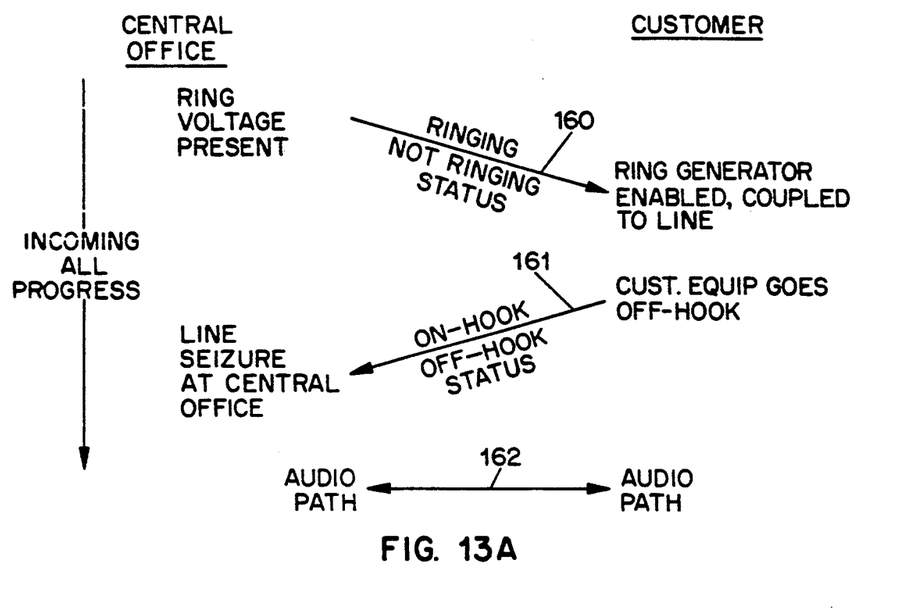
FIGS. 13A and 13B show in time-line form selected events in the progress of a call from the central office to the customer equipment and from the customer equipment to the central office, respectively.

FIG. 13A shows in time line form selected events from the progress of a call originating at the central office. The events shown may occur on either of the two lines provided by the added main line apparatus, and indeed the design of the apparatus is such that events on any one of the two lines have substantially no effect on the call progress of the other of the two lines.

When ringing voltage is detected, say, on line 20, a status message indicative of the start of ringing is transmitted to the customer block 23. This is shown by the downward-sloping arrow 160. The ring generator 27 (referring, for example, to FIG. 4) is enabled and its output coupled to the line 20'. If ringing voltage ceases on line 20, a status message indicative of the cessation of ringing is transmitted to the customer block 23. The output of the ring generator 27 (referring, for example, to FIG. 4) is uncoupled from the line 20'. One skilled in the art will appreciate that nothing in this arrangement is tied to the historically common ringing cadence of two seconds on and four off, but that such a cadence will be replicated faithfully. Furthermore, other cadences will likewise be replicated faithfully, even cadences not yet defined or practiced at the time of installation of the added main line equipment.

Similarly the ringing signal received at line 21 in the central office is echoed at line 21, at the customer equipment, and its cadence is replicated.

It will also be noted that the apparatus of the invention accommodates such conditions as both lines 20 and 21 ringing at once. In that event the ring generator is enabled and the switching arrangement 28 selectively couples the ringing signal to the lines 20' and 21' as needed.

Passing now from the ring status arrow 160 to later events in the call progress, consider what happens if the customer equipment on the ringing line (either 20' or 21') goes off-hook. (In everyday terms this means, for example, a telephone being picked up.) If the line goes off-hook during the time ringing voltage is present, then one of off-hook detection signals 33 (shown for example in FIG. 5A) annunciates the off-hook transition and this is communicated digitally, from the customer block 23 of the added main line system to the central office equipment 22 of the added main line system. If the line goes off-hook during one of the intervals between periods of ringing voltage being present, then the off-hook condition is detected by control and voiceband reconstruct block 31. Regardless of which off-hook detectors (the one in the ring generator or the one in the block 31) senses the off-hook condition, one of line seizure relays 142, 143 (shown in FIG. 12) is energized, seizing the line 20 or 21 at the central office.

Passing now from the off-hook status line 161 to later events in the call progress, bidirectional arrow 162 represents the bidirectional audio path provided between line 20 or 21 at the central office at corresponding line 20' or 21' at the customer.

FIG. 13A omits for clarity numerous events in a call which might occur, and which are replicated as needed. For example, if the customer equipment goes on-hook then a hook status message is passed from equipment 23 to equipment 22, and the corresponding line seizure relay 142, 143 is deenergized, releasing the corresponding line 20 or 21. The response time of hook status signals of the added main line equipment 22, 23 is such that call-waiting flashes are faithfully reproduced as well.

Figure 13B:
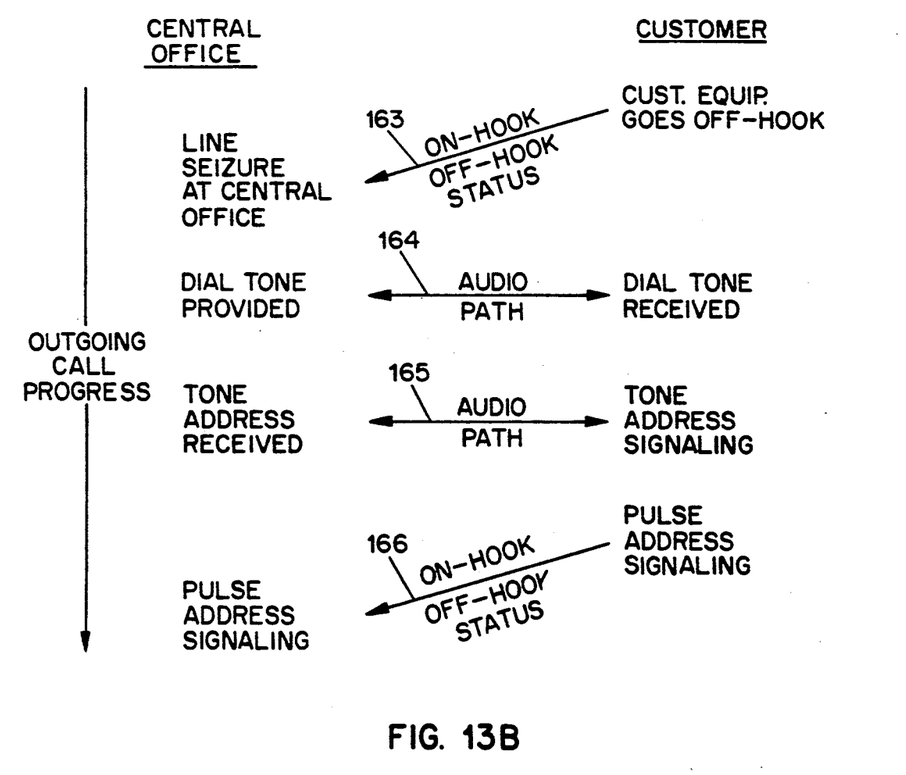

Turning now to FIG. 13B there is shown in time line form a sequence of events for a telephone call originating at the customer equipment. A customer indicates initiation of a call by taking customer equipment off-hook at line 20' or 21'. Block 31 of FIG. 4 detects the off-hook condition which is annunciated to the central office equipment 22. The information flow indicative of the off-hook condition is shown as arrow 163 in FIG. 13B. As described above in connection with line seizure relays 142, 143, the off-hook message causes seizure of the corresponding line 20 or 21.

Passing now from the off-hook status message of line 163 in FIG. 13B, a bidirectional audio path is established between the line 20' or 21' that has gone off-hook and the associated line 20 or 21. This permits the caller at the customer end to hear a dial tone, if any, provided by the central office switchgear at the line 20 or 21. It will be noted that "stutter" dial tones, used by some telephone companies to indicate, say, a stored message, are replicated faithfully to the customer, as is the presumably rare event of dial tone starvation. This bidirectional path is depicted by arrow 164.

If dual tone multifrequency (DTMF) signaling is employed by the customer equipment, the DTMF tones are passed like any other audio signal from the customer block 23 to the central office equipment 22. This is depicted by arrow 165. If, on the other hand, the customer equipment employs rotary dial pulse signaling, then it is the previously mentioned off-hook status channel that replicates the rotary dial pulses. This is depicted by arrow 166.

It will be appreciated that the off-hook status messages thus comprehensively provide functionality for hookswitch flashes (as for call waiting or operator flashing), for rotary pulse dialing, and for ordinary on-hook and off-hook transitions. It will also be appreciated that the described apparatus accommodates any juxtaposition of such events on either of the two lines 20-20' and 21-21'.

Not shown for clarity in FIG. 13B are a generally long-duration bidirectional talk path like that of arrow 162 in FIG. 13A, and a transition indicative of the customer equipment going back on-hook at the end of the telephone call.

Figure 14:
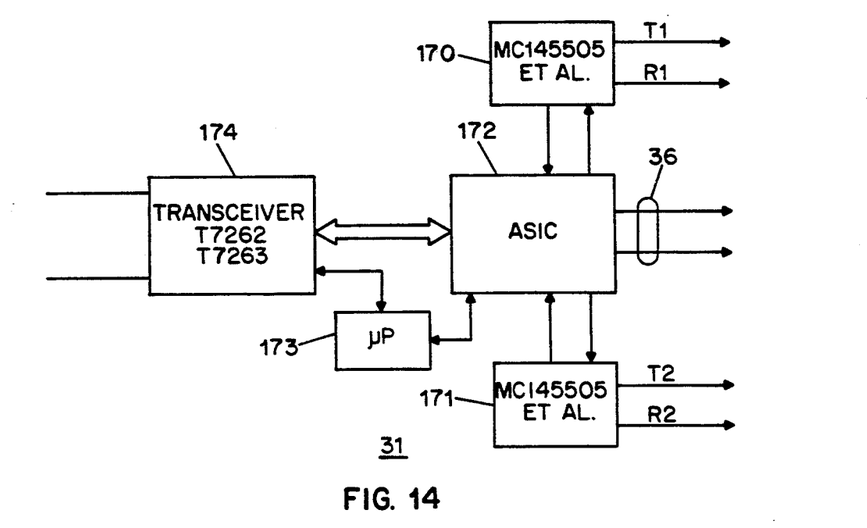
FIG. 14 shows in functional block diagram form the control and voiceband reconstruct block 31 of FIG. 4.

The block 31 of FIG. 4 will now be shown in greater detail in the block diagram of FIG. 14. Transceiver 174 is a close counterpart to transceiver 148 of FIG. 12. ASICs 172 and 146 likewise correspond, as do microprocessors 173 and 147. Finally, specialized line interface blocks 170, 171 correspond to blocks 144, 145. Control lines 36 control switching block 28, shown for example in FIG. 4.

Figure 15:
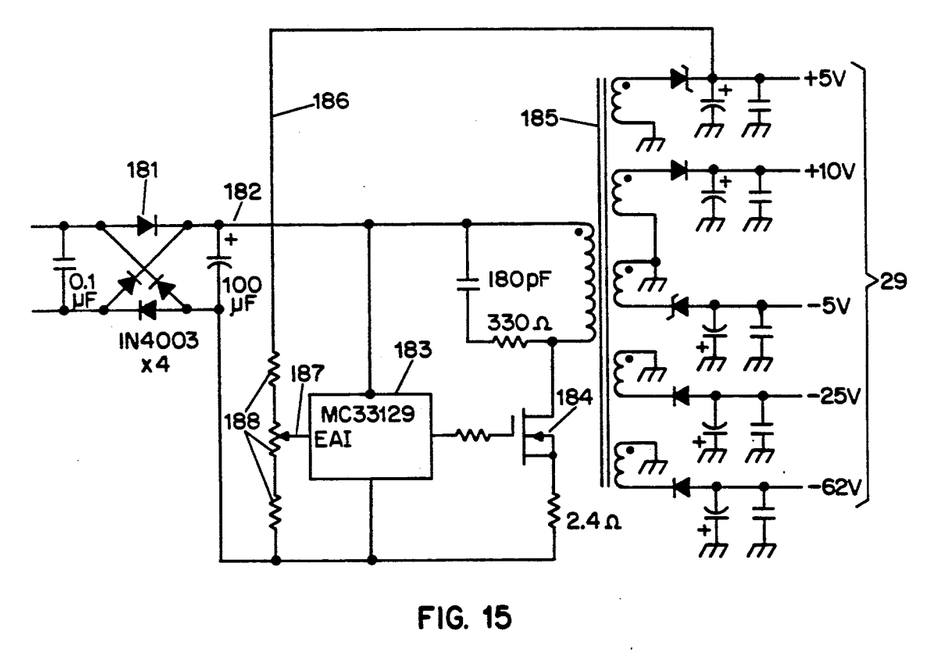
FIG. 15 shows in schematic form the circuitry of the power extraction block 26 of FIG. 4.

Power extraction circuitry 26, shown as a block, for example, in FIGS. 5A and 11, is shown in somewhat greater detail in FIG. 15. The substantially DC component from transformer 130 (shown in FIG. 11) passes to diode bridge 181 and thus to large electrolytic capacitor 182.

Optionally, in installations where it is possible to rely on consistent, standardized installation techniques that preserve line polarity, diode bridge 181 may be omitted. This saves the power loss associated with the two diode voltage drops during operation.

Transformer 185, switching controller 183, FET 184, and associated circuitry (not shown in FIG. 15 for clarity) comprise a switching power supply. Secondary windings are provided with turns counts to give rise to the desired DC outputs 29. Each of the DC outputs 29 is rectified and filtered as required, as shown. The phasing of the secondaries is reversed as shown to provide negative-going DC supplies. Also shown in FIG. 15 is a feedback line 186 which provides a DC feedback level via voltage divider 188 to feedback EAI pin 187. This provides feedback to controller 183 so as to provide stable +5VDC output even in the event of varying input power to the switching power supply. The other power supplies are thus regulated indirectly by the regulation of the +5VDC supply, and their voltage levels are determined in large part by the turns counts of the respective transformer secondary windings of transformer 185.

From the foregoing it will be seen that a ring generator has been disclosed which provides ringing for two customer lines, operating efficiently and within the limited energy budget available with a line-powered added main line system. From the foregoing it will also be seen that there is provided a ring cadence replication means which reproduces faithfully at the customer side any and all ring cadences provided by the central office lines at the central office.

It is understood that while the present invention has been described with respect to a specific exemplary embodiment thereof, various modifications and alterations may be made to the exemplary embodiment by those of ordinary skill in the art without departing from the spirit or scope of the invention as defined in the appended claims. For example, the switching bridge shown here with field-effect transistors could comprise other semiconductors. The circuitry generating the duty cycle waveforms need not be discrete logic as shown here but could be an application-specific integrated circuit. Hybrid assembly techniques could permit the circuitry generating the duty cycle waveforms to reside in a single package along with the power-switching transistors. Finally, while the exemplary embodiment shows two lines provided over a single copper pair, nothing in the apparatus is limited to that number, given appropriate encoding techniques or line conditioning, three or more lines are possible.

What is claimed is:

1. A ring generator for use in a system for providing at least two telephone lines over a single pair o conductors, the system comprising power supply means for deriving from the pair a power supply having first and second levels, said ring generator comprising:
    oscillator means for generating a first repetitive signal at a first frequency;
    drive means responsive to the first repetitive signal for generating first and second repetitive drive signals;
    first switching means controlled by said first repetitive drive signal for controllable providing a current path between the first power supply level and a first output;
    second switching means controlled by said second repetitive drive signal for controllably providing a current path between the second power supply level and the first output;
    third switching means controlled by said second repetitive drive signal for controllably providing a current path between the first power supply level and a second output;
    fourth switching means controlled by said first repetitive drive signal for controllably providing a current path between the second power supply level and the second output;
    fifth switching means controlled by said second repetitive drive signal for controllably providing a current path between the first power supply level and a third output; and
    sixth switching means controlled by said first repetitive drive signal for controllably providing a current path between the second power supply level and the third output;
    whereby the first and second outputs provide a first ringing signal for a first telephone circuit and the first and third outputs provide a second ringing signal for a second telephone circuit.

2. The ring generator of claim 1 wherein the oscillator means comprises a first operational amplifier, a phase shifting network, and a second operational amplifier, each of the operational amplifiers having inputs of two opposite senses, the output of the first operational amplifier coupled to the input of the phase shifting network, the output of the phase shifting network coupled to an input of a first sense of the second operational amplifier, and the output of the second operational amplifier coupled to an input of the first operational amplifier of the sense opposite that of the first sense, whereby the waveform generated is substantially a sine wave.

3. The ring generator of claim 1 wherein the first, second, third, fourth, fifth, and sixth switching means are field-effect transistors, whereby the first and second ringing signals have peak-to-peak amplitudes of approximately the magnitude of the first and second power supply levels.

4. The ring generator of claim 1 further comprising first off-hook detection means and second off-hook detection means,
    said first off-hook detection means comprising first impedance means in series between one of said third and fourth switching means and its respective power supply level, and first voltage-drop sensing means responsive to an increase in the voltage drop across said first impedance means for generating a first off-hook signal,
    said second off-hook detection means comprising second impedance means in series between one of said fifth and sixth switching means and its respective power supply level, and second voltage-drop sensing means responsive to an increase in the voltage drop across said second impedance means for generating a second off-hook signal,
    whereby said first off-hook signal is indicative of an off-hook condition in equipment attached to said first telephone circuit, and whereby said second off-hook signal is indicative of an off-hook condition in equipment attached to said second telephone circuit.

5. The ring generator of claim 1 wherein the first, second, third, and fourth switching means are field-effect transistors, whereby the field-effect transistors form a bridge controlled by the gate of the transistors.

6. The ring generator of claim 1 wherein the first, second, fifth and sixth switching means are field-effect transistors, whereby the field-effect transistors form a bridge controlled by the gate of the transistors.

7. The ring generator of claim 1 wherein the number of telephone lines provided over the single pair of conductors is two.

8. A ring cadence replicator for use in a system for providing at least two telephone lines over a single pair of conductors between a central office and a customer, the ring cadence replicator comprising central office apparatus and customer apparatus, said central office apparatus and customer apparatus disposed for connection by the single pair of conductors;

the central office apparatus comprising:
first and second ring detection means coupled to respective first and second central office telephone lines each of the first and second ring detection means providing respective first and second ring-detect signals; and
encoding means for converting events of the transitions of the first and second ring-detect signals to digital messages and for coupling said digital messages to the single pair of conductors;

the customer apparatus comprising:
decoding means for converting said digital messages to first and second ring-enable signals corresponding temporally to the first and second ring-detect signals;
ring generator means for generating ring voltage; and
switching means for selectively coupling the ring voltage to first and second customer telephone lines corresponding to the first and second central office lines, said switching means coupling and uncoupling the ring voltage to the said first and second central office lines in response to corresponding ones of the first and second ring enable signals;
whereby the ringing cadence, if any, present at the first and second central office lines is replicated at the corresponding customer telephone line.

9. The ring cadence replicator of claim 8 wherein the central office apparatus further comprises power injection means for injecting power into the single pair of conductors, wherein the customer apparatus further comprises power extraction means for extracting power from the single pair of conductors and for providing power to the decoding means, the ring generator means and the switching means, whereby the customer apparatus requires no power from any source other than the single pair of conductors.

10. The ring cadence replicator of claim 9 wherein the injected power is substantially direct current, and the extracted power is substantially direct current.

11. Central office apparatus for use in a ring cadence replicator in a system for providing at least two telephone lines over a single pair of conductors between a central office and a customer, the ring cadence replicator comprising central office apparatus and customer apparatus, said central office apparatus and customer apparatus disposed for connection by the single pair of conductors; the customer apparatus comprising decoding means for converting digital messages to first and second ring-enable signals; ring generator means for generating ring voltage; and switching means for selectively coupling the ring voltage to first and second customer telephone lines corresponding to first and second central office lines, said switching means coupling and uncoupling the ring voltage to the said first and second central office lines in response to corresponding ones of the first and second ring enable signals;

the central office apparatus comprising:
first and second ring detection means coupled to the first and second central office telephone lines, each of the first and second ring detection means providing the first and second ring-detect signals; and
encoding means for converting events of the transitions of the first and second ring-detect signals to the digital messages and for coupling said digital messages to the single pair of conductors;
whereby the ringing cadence, if any, present at the first and second central office lines is replicated at the corresponding customer telephone line.

12. Customer apparatus for use in a ring cadence replicator in a system for providing at least two telephone lines over a single pair of conductors between a central office and a customer, the ring cadence replicator comprising central office apparatus and customer apparatus, said central office apparatus and customer apparatus disposed for connection by the single pair of conductors; said the central office apparatus comprising first and second ring detection means coupled to respective first and second central office telephone lines, each of the first and second ring detection means providing respective first and second ring-detect signals; and encoding means for converting events of the transitions of the first and second ring-detect signals to digital messages and for coupling said digital messages to the single pair of conductors;

the customer apparatus comprising:
decoding means for converting said digital messages to first and second ring-enable signals corresponding temporally to the first and second ring-detect signals;
ring generator means for generating ring voltage; and
switching means for selectively coupling the ring voltage to first and second customer telephone lines corresponding to the first and second central office lines, said switching means coupling and uncoupling the ring voltage to the said first and second central office lines in response to corresponding ones of the first and second ring enable signals;
whereby the ringing cadence, if any, present at the first and second central office lines is replicated at the corresponding customer telephone line.

* * * * *